United States Patent [19]

Satoh et al.

[11] 4,426,216
[45] Jan. 17, 1984

[54] PROCESS FOR PRODUCING OPTICAL GLASS

[75] Inventors: Shin Satoh, Iruma; Kenzo Susa, Tokyo; Iwao Matsuyama, Sagamihara; Tsuneo Suganuma, Tokorozawa, all of Japan

[73] Assignee: Hitachi, Ltd., Tokyo, Japan

[21] Appl. No.: 337,451

[22] Filed: Jan. 6, 1982

[51] Int. Cl.$^3$ .............................................. C03B 19/06
[52] U.S. Cl. ...................................... 65/18.1; 65/17; 65/30.1; 65/32; 501/12
[58] Field of Search ............... 65/17, 134, 32, 60.1, 65/18.1, 30.1; 501/12, 900, 54; 423/338; 264/1.2, 1.5, 2.6, 332

[56] References Cited

U.S. PATENT DOCUMENTS

| 3,459,522 | 8/1969 | Elmer et al. | 65/32 X |
| 3,666,414 | 5/1972 | Bayer | 501/12 |
| 4,317,668 | 3/1982 | Susa et al. | 501/12 X |
| 4,338,111 | 7/1982 | Edahiro et al. | 65/32 X |

FOREIGN PATENT DOCUMENTS 55-167143  12/1980  Japan .................................. 65/18.1

OTHER PUBLICATIONS

Susa et al; Electronics Letters (10 Jun. 1982) vol. 18 No. 12, pp. 499–500.

*Primary Examiner*—Kenneth M. Schor
*Attorney, Agent, or Firm*—Antonelli, Terry & Wands

[57] ABSTRACT

Optical glass is produced by heating a porous gel to a high temperature to partly sinter it, heating it in a chlorine-containing atmosphere to subject it to hydroxyl group removal treatment, and then further heating it to sinter it. The optical glass produced by this process does not rise in bubbles even when heated.

14 Claims, 1 Drawing Figure

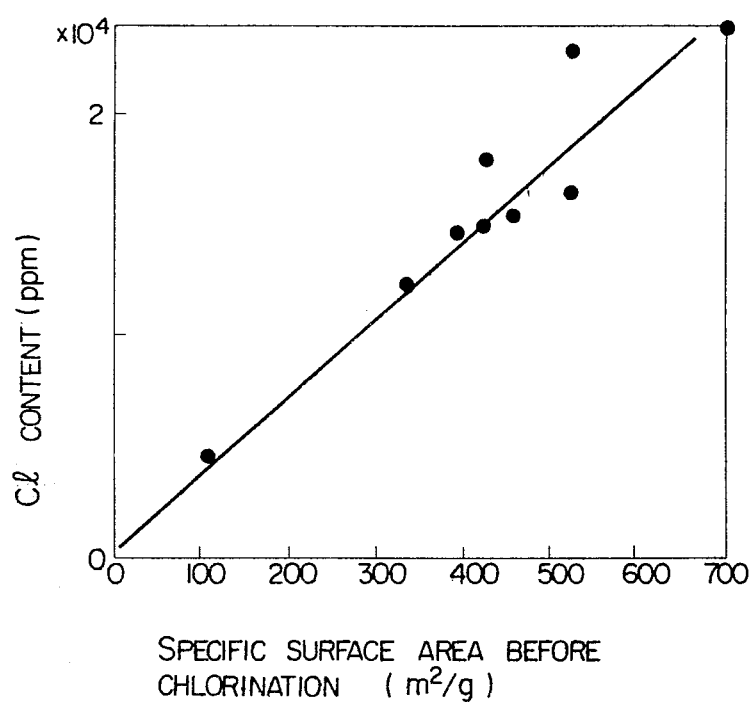

PROCESS FOR PRODUCING OPTICAL GLASS

BACKGROUND OF THE INVENTION

The present invention relates to a process for producing optical glass by heating and sintering a porous gel prepared by hydrolyzing a metal alkoxide. Particularly, it relates to a process for producing glass for optical parts required to have a low residual water content, for example, optical guides, lenses, prisms, and the like.

There has recently been known a method for producing a non-porous block body (e.g., silica glass body) by sintering a porous gel obtained by hydrolyzing a metal alkoxide (e.g., $Si(OCH_3)_4$) (hereinafter referred to as "a sol-gel method").

As references presenting such a process for producing glass, there may be exemplified M. Yamane et al.; Journal of Materials Science, vol. 14 (1979), pages 607-611. There have been invented, by inventors including the present inventors as main ones, processes for producing optical glass by sintering a high silica gel obtained by hydrolyzing a metal alkoxide (wherein the metal also include Si and Ge). Details of these inventions are disclosed in (a) the specification of a patent application already filed in Japan as Japanese Patent Application No. 3957/79 in which the main inventors are the present inventors, and also filed in U.S.A., Great Britain, West Germany, France, Netherlands and Canada claiming the priority of said Japanese Patent Application, (b) the specifications of patent applications already filed in Japan as Japanese Patent Application Nos. 150082/79, 169335/79, 95755/80 and 95758/80 in which the inventors are the same as the present inventors, and also filed in U.S.A. and Europe (European Patent Application in which Great Britain, West Germany, France and Netherlands are designated) claiming the priorities of these Japanese Patent Applications, (c) the specification of a patent application already filed in Japan as Japanese Patent Application No. 4600/80 in which the inventors are the same as the present inventors, and also filed in U.S.A. and Europe (European Patent Application in which Great Britain, West Germany, France and Netherlands are designated) claiming the priority of said Japanese Patent Application, and (d) the specifications of patent applications already filed in Japan as Japanese patent Application Nos. 55485/80 and 95757/80 in which the inventors are the same as the present inventors, and also filed in U.S.A., Great Britain and West Germany claiming the priorities of these Japanese Patent Applications.

The outline of the aforesaid sol-gel method comprises using, for example, $Si(OCH_3)_4$ as a starting material, mixing and stirring it with $CH_3OH$ and $H_2O$, transferring the resulting mixture into a desired vessel, making the vessel almost air-tight, allowing the vessel to stand to subject the mixture to gelation, gradually lowering the degree of air-tightness of the vessel to evaporate residues (water, alcohol, etc.,) with drying, and then sintering the gel at a temperature of 1,100° C. or higher to make it into glass.

The silica gel obtained by the aforesaid sol-gel method is a porous block having a specific surface area of about 800 $m^2/g$ and has a pore size of 20 to 100 Å, though that depends on the production conditions. When the gel is assumed to be an aggregate of fine particles, it corresponds to an aggregate of fine particles having a size of about 50 Å. When there is heated and sintered as usual such a porous block prepared by the hydrolysis, said block having a large specific surface area, namely, many adsorptive points on surface, the gel sometimes rises in bubbles, and, in an extreme case, it bursts. Main adsorbates causing the above-mentioned rising-in-bubbles include, for example, water and the alcohol which are starting materials for the hydrolysis solution and the chemically adsorbed $OCH_3$ group, OH group, and the like. Therefore, in sintering the porous gel, the removal of these residues is indispensable.

Concretely, the adsorbed alcohol and water are removed by heating the porous gel to about 300° C., after which the $OCH_3$ group is subjected to oxidation treatment (called "$OCH_3$ removal treatment" or "carbon removal treatment") at about 400° C. As to treatment of removing the OH group (called "OH removal treatment" or "hydroxyl group removal treatment"), it is well known to those skilled in the art that it can be achieved to a certain extent by heating the porous gel at 400° C. or higher in an atmosphere of thionyl chloride or chlorine. Since the OH removal treatment is attributable to the substitution reaction of Cl for OH, a rapid reaction is achieved at 700° C. or higher.

When the porous gel subjected to the above-mentioned heating, oxidation and OH removal treatments is heated and sintered, it sometimes rises in bubbles. There are thought to be two causes for this. One of them is that a large amount of Cl substituted for OH in the OH removal treatment is incorporated into the glass by sintering. The other is that the atmosphere gas for sintering is shut up in closed pores. The latter cause is also dependent on the pore distribution in the gel and the like.

When glass rises in bubbles owing to heating, the glass is inevitably extremely limited in use and, in general, becomes unsuitable for optical uses, and it becomes impossible to produce an optical guide by using the glass as a base material.

The following references are cited to show the state of the art; (i) Japanese Patent Appln Kokai (Laid-Open) Nos. 100231/80, 92135/81 and 104732/81, and (ii) M. Yamane et al., Journal of Materials Science, vol. 14 (1979), pages 607-611.

SUMMARY OF THE INVENTION

An object of this invention is to provide a process for producing such optical glass as does not rise in bubbles even when heated and which process overcomes the disadvantages of the above-mentioned prior art, and to provide a process for producing such optical glass that does not rise in bubbles even when heated and sintered and by which in a production process of glass having a low OH content, the content in the glass of chlorine substituted for OH in OH removal treatment is greatly reduced.

This invention provides a process for producing optical glass which comprises
 (i) a step of partly sintering a porous gel by heating said gel to a high temperature, (ii) a step of subjecting the partly sintered gel to a hydroxyl group removal treatment by heating it in a chlorine-containing atmosphere to such a temperature as is lowered than the heating temperature in the above-mentioned step (i) and ranges from 400° C. to 1,000° C., and
 (iii) a step of sintering the thus treated gel by heating it to a temperature higher than the heating temperature in the above-mentioned step (ii).

BRIEF DESCRIPTION OF THE DRAWING

The attached drawing is a graph showing the relationship between the specific surface area of silica gel before the hydroxyl group removal treatment (step (ii)) and the chlorine content in glass obtained by subjecting the gel to the hydroxyl group removal treatment and the sintering treatment (step (iii)).

DESCRIPTION OF THE PREFERRED EMBODIMENTS

The process for producing optical glass of this invention is characterized by inserting a step of partly sintering porous gel with heating before a step of heat treatment in an atmosphere of chlorine in a well-known process for producing optical glass comprising preparing a porous gel by hydrolyzing a metal alkoxide, subjecting the porous gel (obtained by previously subjecting the porous gel to a treatment of removing the adsorbed water, alcohol and OCH$_3$ group by heating) to hydroxyl group removal treatment by heating it in an atmosphere of chlorine, and then sintering the porous gel by heating it to about 1,050° C. to about 1,300° C.

The porous gel used in the aforesaid step (i) is prepared by hydrolyzing a metal alkoxide, freed of the adsorbed water and alcohol by heating, and then subjected to OCH$_3$ group removal treatment by further heating it to a higher temperature. The removal of the adsorbed water and the like can sufficiently be achieved also by heating the porous gel in a suitable atmosphere containing oxygen at a suitable heating rate. A representative porous gel in this invention is silica gel, which is prepared by hydrolyzing silicon alkoxide, and is heated, for example, to about 300° C. for removal of the adsorbed water and alcohol and, for example, to about 400° C. for the removal of the OCH$_3$ group. The silica gel may contain at least one desired dopant element (e.g., Ge, P, B, Ta, Zr or the like). A process for producing a porous gel is described in detail also in the specifications of the patent applications described in above BACKGROUND OF THE INVENTION, and as the porous gel in this invention, those produced according to the prior arts may be used.

The partly sintering in the step (i) is easy when it is carried out at a temperature a little lower than the conventionally known sintering temperature, and, in a word, it is important that the specific surface area of the gel should be adjusted to 30 to 100 m$^2$/g by the partly sintering in said step. The gel is given a specific surface area of 30 to 100 m$^2$/g by partly sintering it in the step (i), and, for example, in the case of porous silica gel, it is sufficient to heat it at about 950° C.–1,100° C. for a predetermined time, or heat it to said temperature at a predetermined heating rate. Needless to say, the higher the heating temperature is made, the shorter the substantial heating time is made. Usually, the gel is heated for 0.1 to 10 hours. Tha atmosphere is usually an oxidizing atmosphere, and there may be used pure oxygen, inert gases such as He and the like or neutral gases such as N$_2$ and the like containing 1% by volume or more of oxygen, air, etc, though inert or neutral gases alone may be used. In general, an atmosphere for the OCH$_3$ group removal treatment is conveniently used. When a gas containing 50% by volume or more of He, particularly a mixed gas of He and oxygen is used, particularly good results can be obtained.

As to the aforesaid partly sintering in the practical production of glass, it is sufficient that such heating conditions and atmosphere that the specific surface area becomes 30 to 100 m$^2$/g are found by performing a simple experiment according to the above-mentioned matters, after which the partly sintering is carried out according to the experimental results.

When the specific surface area of the gel exceeds 100 m$^2$/g, the gel tends to rise in bubbles when heated and sintered unless the gel is subjected to a special step of removing chlorine substituted for the hydroxyl group, and when it is less than 30 m$^2$/g, the hydroxyl group removal rate in the aforesaid step (ii) becomes very slow. Therefore, these cases are both not desirable. The specific surface area of the gel is more desirably 100 to 70 m$^2$/g, most desirably about 90 m$^2$/g.

It is sufficient that the hydroxyl group removal treatment in the aforesaid step (ii) is carried out at 400° to 1,000° C. in the heretofore known manner, and its details are also disclosed in the above-mentioned specifications of the patent applications. However, the treatment should be carried out at a temperature lower than the temperature for the partly sintering in the aforesaid step (i); otherwise the sintering proceeds further and this is not desirable.

When the treatment temperature is lower than 400° C., a hydroxyl group removal phenomenon is hardly observed, and when it exceeds 1,000° C., chlorine in the atmosphere tends to be incorporated into the glass. Therefore, these cases are both not desirable. The treatment temperature in the step (ii) is more preferably 700° C. to 900° C., most preferably about 800° C.

The atmosphere in the step (ii) is a chlorine-containing atmosphere, and can be a gas containing 1% or more of Cl$_2$, though besides Cl$_2$, chlorine compounds such as SiCl$_4$ and the like may be also used. It is also possible to replace the Cl$_2$ by a compound which is pyrolyzed to generate Cl$_2$, for example, SOCl$_2$, CCl$_4$ or the like, and as a gas to be mixed therewith, there may be used inert gases, neutral gases, oxygen, or the like. The atmosphere can be more preferably O$_2$ gas containing 5 to 50% by volume of Cl$_2$. When the Cl$_2$ content in the atmosphere is less than 1% by volume, no sufficient hydroxy-group-removing effect can be expected to be brought about. The atmosphere may also be pure chlorine. The heating time may be determined according to conventional processes and is generally 1 to 20 hours.

It is sufficient that the sintering in the step (iii) is carried out according to the sintering step well known in the sol-gel method; in usual, the gel is heated in He or in vacuo at 1,050° to 1,300° C., and the heating time is 1 hour or less. The heating temperature in the step (iii) is made higher than the heating temperature (at which the sintering does not proceed) in the step (ii).

The process for producing optical glass of the present invention is applicable both to large-sized glass and to small-sized glass, and in both cases, satisfactory results can be obtained. Particularly when a large-sized glass material is produced by the sol-gel method, it becomes almost impossible to prevent the gel from rising in bubbles unless the process of the present invention is employed.

The substitution of Cl for OH in the hydroxyl group removal treatment is thought to proceed mainly on the surfaces of pores of the gel because Cl$_2$ does not diffuse in bulky silica glass body at a temperature of 800° to 1,000° C. That is to say, the number of adsorptive sites for Cl is expected to be proportional to the surface area of the porous block. On the other hand, the diffusion rate of OH present in the fine particles (having a size corresponding to about 100 Å) of the porous gel is fairly high as estimated from the diffusion coefficient D ($=\sim 10^{-9}$ cm$^2$/s) of OH, at 800° C., in silica glass. Therefore, the OH group present in the inside of the fine particles diffuses as far as the surfaces of the fine particles (surfaces of the pores), and then is replaced by Cl to be removed.

The results of an experiment performed in the expectation described above are shown in FIG. 1. The axis of abscissa refers to the specific surface areas of porous gels and the axis of ordinate to the chlorine content of glass obtained by subjecting each of the gels having the respective specific surface areas shown on the axis of abscissa to OH removal treatment at 900° C. and then sintering it to make it non-porous. Here, the chlorine content is obtained from the refractive index of the non-porous glass body. The porous gels differing in specific surface area from one another were prepared by a method comprising partly sintering a gel at 900° to 1,100° C. to partly stop the pores, thereby reducing the surface area of the pores. As is obvious from the attached drawing, the amount of chlorine contained in the non-porous glass body after sintering is proportional to the specific surface area of the gel before chlorination for OH removal. In addition the amount of OH was outside the limits of measurement (<3 ppm) at all the measured points in the drawing. Further, it is added that when the specific surface area was reduced, the rate of the OH removal treatment was somewhat slowed down.

It has become clear from the above that the Cl content in the bulky glass body can be lowered by reducing the specific surface area of the porous gel.

The present invention is further explained below in more detail referring to Examples.

Example 1

There were mixed and stirred 15.2 g of Si(OH$_3$)$_4$, 14.4 g of methanol and 7.2 g of distilled water, and the resulting mixture was placed in a glass vessel having an inside diameter of 10 mm, and then subjected to gelation in an oven at 70° C., after which the residual water and methanol were evaporated to dry the gelation product, whereby a cylindrical gel having a diameter of about 5.3 mm was prepared. The gel had a specific surface area of about 800 m$^2$/g, a bulk density of about 1.15 g/cm$^3$, and an average pore size of about 20 Å as calcuated from the specific surface area and the bulk density. Several gel pieces obtained by cutting said gel to a length of 20 mm were heated at the same time, after which the adsorbed alcohol and water were first evaporated at 200° C., and OCH$_3$ was then oxidized and removed at 400° C. Subsequently, one of the gel pieces was heated to 800° C. at a heating rate of about 100° C./hr in an atmosphere of oxygen, after which its specific surface area was measured to find that it was somewhat decreased to about 500 m$^2$/g. When the other gel pieces were similarly heated to temperatures of 900° C., 1,000° C. and 1,100° C., respectively, their specific surface areas could be adjusted to about 300, about 100 and about 10 m$^2$/g, respectively. The atmosphere was oxygen in all the cases.

However, the test piece in the case of heating to 1,100° C. rose in bubbles owing to stopped pores which are thought to have been formed in the process of sintering.

When gel pieces prepared under the same conditions as above were subjected to oxidation treatment under the same conditions, and then heated in an atmosphere containing 50% by volume or more of He (the balance being oxygen) to partly sinter it, the specific surface areas in the case of heating them to 800° C., 900° C., 1,000° C. and 1,100° C., respectively, were the same as the above-mentioned respective specific surface areas, and even the test piece in the case of heating to 1,100° C. did not rise in bubbles. However, when this test piece sintered at 1,100° C. was heated to 1,200° C., it rose in bubbles probably because of OH contained therein.

The gel pieces partly sintered at 800° C., 900° C. and 1,000° C. respectively, in the aforesaid He-containing atmosphere were treated at 800° C. in an atmosphere of chlorine for about 10 hours, and then heated to 1,300° C. and sintered in an atmosphere of He. The amounts of OH and Cl in the thus treated gel pieces were measured to find that the amount of OH was 3 ppm or less, and that the amount of Cl contained therein decreased with a decrease in the specific surface area before chlorination and was about 4,000 ppm for the test piece which had been sintered at 1,000° C. and had a specific surface area of about 100 m$^2$/g. Rising-in-bubbles due to the contained chlorine took place when the amount of the contained chlorine was about 5,000 ppm or more. Therefore, it is desirable to remove OH at a specific surface area of 100 m$^2$/g or less. However, the OH removal treatment rate tends to be slowed down with the reduction of the specific surface area. As a result of experiments, it was revealed that when the specific surface area is 30 m$^2$/g or less, the treatment cannot be completed at a practical rate.

The specific surface area and pore distribution of the produced gel vary depending on the conditions of producing the gel, for example, the pH value of a hydrolysis solution for Si(OCH$_3$)$_4$. With the variation of the gel state, the relationship between the aforesaid partly sintering temperature and the specific surface area of the gel varies. However, the techniques and conceptions for reducing the amount of Cl remaining in the bulky glass body which have been stated in this invention are widely applicable, and it is sufficient that necessary data are ascertain by experiments. Further, said techniques and conceptions, of course, also apply in the case of various starting materials, particularly compositions comprising silica and at least one dopant element (e.g., Ge, P, Zr, Ti, Sn, Bi, Te, Ta or the like), and this is not difficult to understand.

Obviously, many modifications and variations of the present invention are possible in the light of the above teachings. It is therefore to be understood that within the scope of the appended claims, the invention may be practiced otherwise than as specifically described.

What is claimed is:

1. A process for producing optical glass which comprises:
   (i) a step of partly sintering a porous hydrolyzed alkoxide gel by heating said gel to a high temperature and for a time sufficient such that said gel is partly sintered until the specific surface area of said gel becomes 30 to 100 m$^2$/g,
   (ii) a step of subjecting the partly sintered gel to a hydroxyl group removal treatment by heating it in a chlorine-containing atmosphere to a temperature lower than the heating temperature in the above-mentioned step (i) such that sintering does not occur during step (ii), and
   (iii) a step of sintering said gel by heating it to a temperature higher than the heating temperature in the abovementioned step (ii) and for a time sufficient to produce said optical glass.

2. A process for producing optical glass according to claim 1, wherein said porous gel is silica gel.

3. A process for producing optical glass according to claim 1, wherein, prior to step (i), the porous hydrolyzed alkoxide gel is prepared by freeing a hydrolyzed metal alkoxide of adsorbed water and alcohol by heating and then subjecting the freed alkoxide to $OCH_3$ group removal treatment by further heating to a temperature higher than the temperature used for freeing the adsorbed water and alcohol.

4. A process for producing optical glass according to claim 1, wherein said specific surface area is 100 to 70 $m^2/g$.

5. A process for producing optical glass according to claim 1, 2 or 4, wherein the atmosphere in said step (i) is at least one member selected from the group consisting of oxygen, inert gases, neutral gases and air.

6. A process for producing optical glass according to claim 5, wherein the atmosphere in said step (i) is a gas containing He.

7. A process for producing optical glass according to claim 5, wherein the atmosphere in said step (i) is a gas containing 50% by volume or more of He.

8. A process for producing optical glass according to claim 5, wherein the atmosphere in said step (i) is a gas containing oxygen and 50% by volume or more of He.

9. A process for producing optical glass according to claim 2, wherein said silica gel in step (i) is heated to a temperature between 950° C. to 1,100° C.

10. A process for producing optical glass according to claim 9, wherein the heating in step (i) is performed 0.1 to 1.0 hours.

11. A process for producing optical glass according to claim 10, wherein the heating in step (i) is carried out in an oxidizing atmosphere.

12. A process for producing optical glass according to claim 1, wherein said gel in step (ii) is heated to a temperature between 400° C. to 1,000° C.

13. A process for producing optical glass according to claim 12, wherein said gel in step (ii) is heated to a temperature between 700° C. to 900° C.

14. A process for producing optical glass according to claim 1, wherein said gel in step (iii) is heated to a temperature between 1,050° C. to 1,300° C.

* * * * *

UNITED STATES PATENT AND TRADEMARK OFFICE
CERTIFICATE OF CORRECTION

PATENT NO. : 4,426,216

DATED : January 17, 1984

INVENTOR(S) : SHIN SATOH ET AL

It is certified that error appears in the above-identified patent and that said Letters Patent is hereby corrected as shown below:

Please delete the Assignee in the first column on the first page of said patent (Hitachi, Ltd., Tokyo, Japan) and insert the following new Assignee therefor:

--Hitachi, Ltd., Tokyo, Japan, and Hitachi Cable, Ltd., Tokyo, Japan.--

Signed and Sealed this

Twenty-fourth Day of July 1984

[SEAL]

Attest:

GERALD J. MOSSINGHOFF

Attesting Officer     Commissioner of Patents and Trademarks